United States Patent [19]
Avakov

[11] Patent Number: 5,853,118
[45] Date of Patent: Dec. 29, 1998

[54] GRIPPER BLOCK FOR COILED TUBING INJECTORS

[75] Inventor: Vladimir A. Avakov, Duncan, Okla.

[73] Assignee: Halliburton Energy Services, Inc., Duncan, Okla.

[21] Appl. No.: 605,606

[22] Filed: Feb. 22, 1996

[51] Int. Cl.[6] ............................................... B65H 20/00
[52] U.S. Cl. .......................................................... 226/173
[58] Field of Search ..................... 226/172, 173, 226/190, 193, 194

[56] References Cited

U.S. PATENT DOCUMENTS

| | | |
|---|---|---|
| 1,355,449 | 10/1920 | Campbell . |
| 2,679,924 | 6/1954 | Powell . |
| 3,108,682 | 10/1963 | Zipper . |
| 3,258,110 | 6/1966 | Pilcher . |
| 3,285,485 | 11/1966 | Slator . |
| 3,559,905 | 2/1971 | Palynchuk . |
| 3,606,810 | 9/1971 | Kozij ........................................ 226/173 |
| 3,615,154 | 10/1971 | Pryor ........................................ 226/173 |
| 3,754,474 | 8/1973 | Palynchuk . |
| 3,841,407 | 10/1974 | Bozeman ................................. 166/315 |
| 3,869,038 | 3/1975 | Piper . |
| 3,945,547 | 3/1976 | Ledebur . |
| 4,064,987 | 12/1977 | Rowan . |
| 4,515,220 | 5/1985 | Sizer . |
| 4,585,061 | 4/1986 | Lyons et al. .............................. 166/77 |
| 4,624,726 | 11/1986 | Harper, Jr. ............................... 226/173 |
| 4,655,291 | 4/1987 | Cox . |
| 4,787,505 | 11/1988 | Tweedy . |
| 5,094,340 | 3/1992 | Avakov . |
| 5,279,364 | 1/1994 | Jantzen et al. ........................... 226/172 |
| 5,309,990 | 5/1994 | Lance ...................................... 226/172 |
| 5,326,010 | 7/1994 | Moras ...................................... 226/172 |

FOREIGN PATENT DOCUMENTS

| | | | |
|---|---|---|---|
| 0992114 | 6/1976 | Canada | .................................. 226/173 |
| 1122762 | 9/1956 | France | .................................... 226/173 |

Primary Examiner—Charles A. Marmor
Assistant Examiner—Matthew A. Kaness
Attorney, Agent, or Firm—Stephen R. Christian

[57] ABSTRACT

A gripper block for use in grippingly engaging coil tubing, pipe, rod, cable, or like objects having various outside dimensions for ultimately applying a longitudinal load thereto. The subject gripper block has an attachment point preferably at or near the center of the block body to enable attachment to at least one endless chain of an injector apparatus. The gripper block further has a pair of gripper surfaces formed thereon, these gripper surfaces are generally planar and tilted away from each other so as to diverge away from the tubing to be gripped at approximately 90 degrees. The gripper surfaces thus preferably provide a V-shaped engagement configuration which is quite effective in gripping objects of differing outside dimensions with no or minimal scarring of such objects.

9 Claims, 7 Drawing Sheets

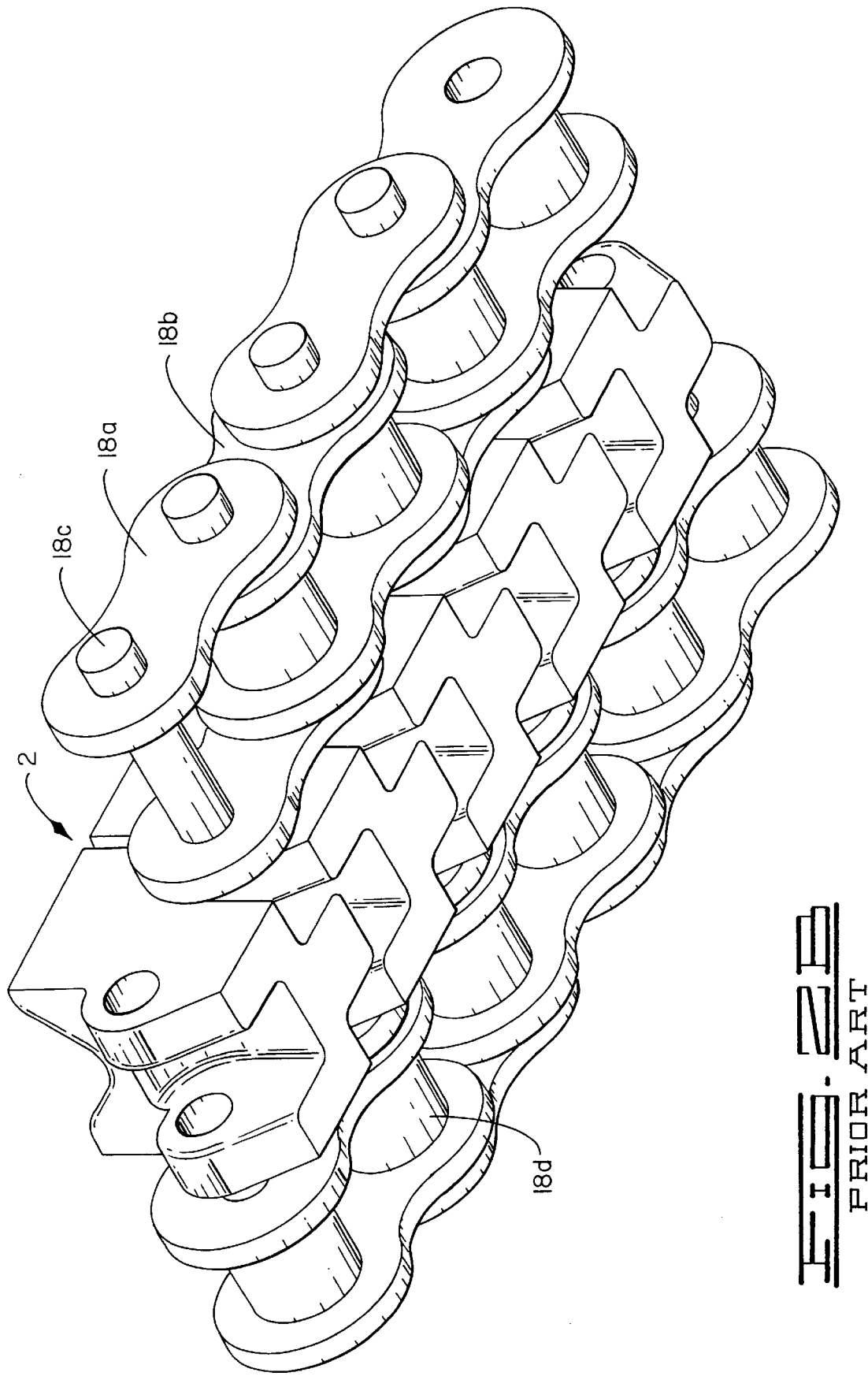

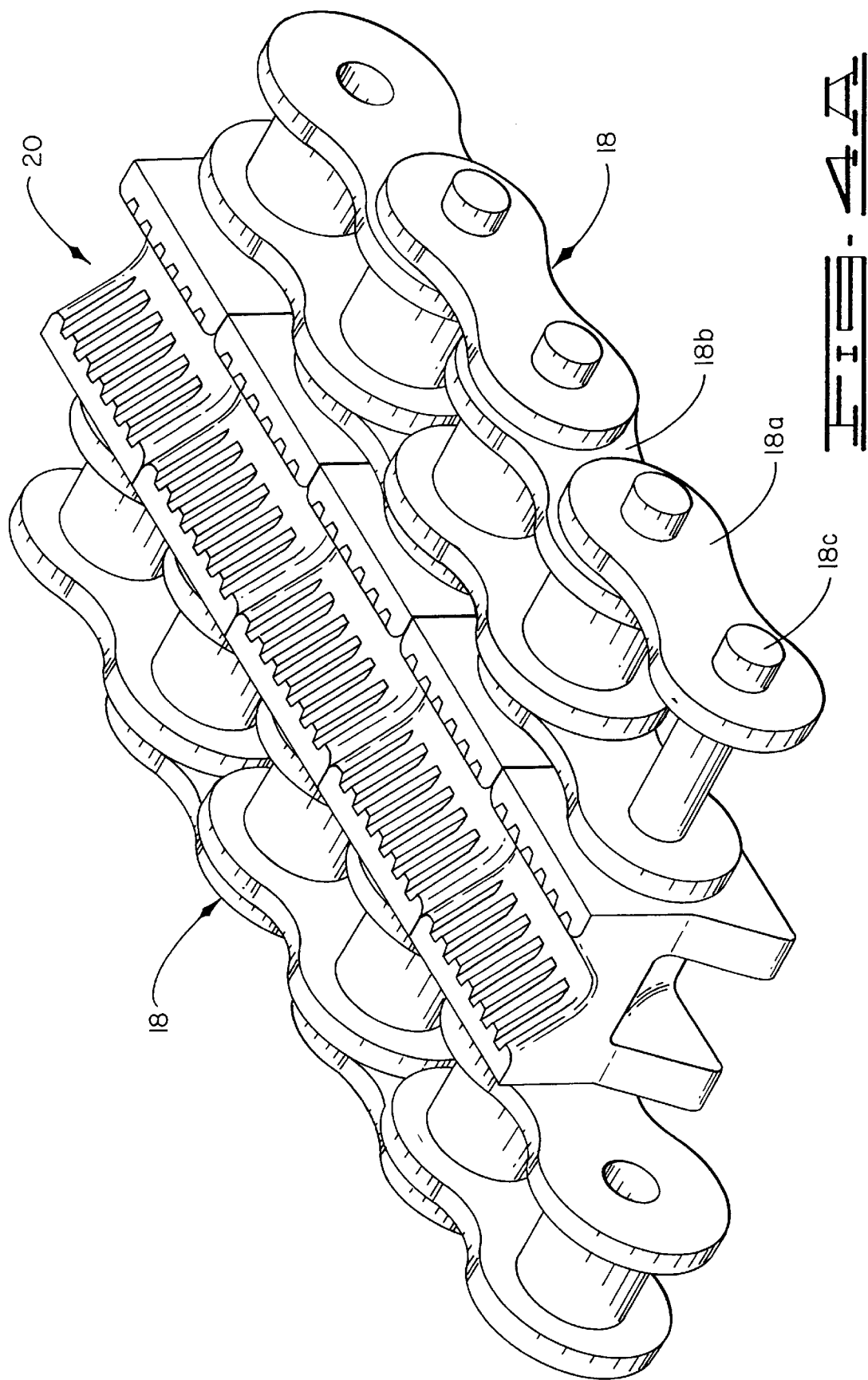

GRIPPER BLOCK FOR COILED TUBING INJECTORS

BACKGROUND OF THE INVENTION

This invention pertains to coiled tubing injection equipment used in the oil and gas production industry and more particularly pertains to coiled tubing gripper blocks installed in coiled tubing injection equipment. Such equipment is typically used to force coiled tubing into and out of oil and gas production wells.

Coiled, or reeled, tubing has been used for years to force coiled tubing into vertical as well as horizontal wellbores in order to perform a wide variety of operations such as completions, washing, circulating, production, production enhancement, cementing, inspecting, logging, etc.

Many coiled tubing injectors are in common use today and a number of patents relating thereto have been issued. Generally such coiled tubing injectors make use of a pair of opposed endless gripper chains mounted in a common plane. The gripper chains are usually made up of links, rollers, and gripper blocks. The gripper blocks on each drive chain opposingly engage the tubing so as to firmly grasp the tubing in such a way that upon driving the gripper chains, the gripper blocks force the tubing into or out of the wellbore. Upon setting the gripper chains into motion and thereby injecting the tubing, and upon each opposing pair of gripper blocks releasing their hold on the tubing, another pair of opposing gripper blocks grippingly engage the tubing and the cycle continues until the desired amount of tubing has been inserted or withdrawn from the wellbore, or until the gripper chains are no longer driven. Over the years, a variety of gripper blocks to improve the performance of coiled tubing injector units have been introduced to the art. Such improvements include designs directed to increasing the load carrying capability of the gripper block, eliminating or limiting scarring and distortion of the tubing caused by gripper block engagement, and providing the ability to accommodate differing tubing diameters without having to change gripper blocks. One such prior art gripper block is disclosed in U.S. Pat. No. 5,094,340 to Avakov, assigned to the assignee of the present invention, and is specifically referenced herein. FIGS. 1A and 1B herein show the prior art gripper block discussed in the U.S. Pat. No. 5,094,340. As depicted in FIGS. 1A and 1B, such a prior art gripper block 2 has a block body 4 having a tongue 6 with a pin-hole bore 8 therein. Upon the opposite end of block body 4 there are a pair of ears 10 defining a slot 12 for accommodating a tongue 6 of an adjacently positioned block body 2 as typically installed in an injector apparatus. Ears 10 in the prior art block body 2 have respective pin-holes 14. On the upper region of block body 4 there is a gripper surface base region 16 shown having a pair of opposingly angled gripper surfaces 16a and 16b forming a V-shaped gripping region.

FIGS. 2A and 2B of the drawings provide a segmented view of a typical installation of the prior art gripper blocks, disclosed in the U.S. Pat. No. 5,094,340, upon a pair of parallel chains within an injector apparatus. Chains 18 typically include an inner plate 18a, outer plate 18b, pin 18c, and roller bushing 18d. Pin 18c is of sufficient length to allow it to be fitted into pin-holes 8 and 14 of prior gripper block 2.

Although, the gripper block disclosed in the U.S. Pat. No. 5,094,340 to Avakov has enjoyed commercial success, there remains a need for improving and enhancing certain characteristics of gripper blocks due to their critical importance in the operation of coiled tubing injector units.

One such characteristic of priorly known gripper blocks, such as the block disclosed in the U.S. Pat. No. 5,094,340, is that the multiple pin-holes positioned horizontally within the block body, which serve as a way to secure the gripper block onto respective links of a host gripper chain, create an added machining expense as well as causing the gripper block to more likely suffer from stress induced cracking in the pin-hole regions.

Other areas in which embodiments of the prior art gripper block of the U.S. Pat. No. 5,094,340 are in need of improvement include: increasing the structural strength of the gripper block, decreasing the complexity of machining the gripper block, reducing the weight of the gripper block, and reducing the manufacturing cost of the gripper block. These and other improvements to gripper blocks, such as the one disclosed in the above referenced U.S. Pat. No. 5,094,340, are disclosed herein.

SUMMARY OF THE INVENTION

The present invention is directed toward an improved gripper block for use in grippingly engaging coil tubing, pipe, rod, cable, or like objects having various outside dimensions for ultimately applying a longitudinal load thereto. The improved gripper block has an attachment point preferably at or near the center of the block body for providing a means of attachment to at least one endless chain of an injector apparatus. The improved gripper block further has a pair of gripper surfaces formed thereon, these gripper surfaces are generally planar and tilted away from each other so as to diverge away from the tubing to be gripped, at approximately 90 degrees. The gripper surfaces thus provide a V-shaped engagement configuration which is quite effective in gripping objects of differing outside dimensions with no or minimal scarring of such objects.

The gripper body of the present gripper block further includes a tongue portion and a recessed region configured to unobstructively accommodate the tongue portion of an adjacently positioned gripper block.

BRIEF DESCRIPTION OF THE DRAWINGS

FIG. 2B is a perspective view of the multitude of gripper blocks and gripper chains of FIG. 2A taken from below.

FIG. 4A is a perspective view of a multitude of the preferred gripper blocks installed between a segment of a pair of gripper chains.

Referring now to FIGS. 3A through 4B of the drawings. A preferred embodiment of an improved gripper block 20 is shown. Improved gripper block 20 has opposite sides 24 positioned along and preferably perpendicular to a lateral axis created for reference purposes, opposite ends 25 and 29 positioned along an imaginary longitudinal axis, and a tubing or other article gripping base region 36 running parallel to the longitudinal axis is provided for gripping a section of continuous tubing, tube, or other article that is to be forcefully injected or otherwise have a force imparted thereon. Such sides 24, ends 25 and 29, and gripping region 36 thereby provide an overall definition of block 20. End 25 can best be seen in FIG. 3B. Extending from end 25 is a generally wedged-shaped tongue 26 having sides 27. Block sides 25 preferably have a single bore hole, or pin-hole 28, positioned along the imaginary lateral axis. However, a bore hole extending entirely through block body 20 can be replaced with, for example two bore holes, or pin-holes, which are positioned along the same imaginary lateral axis but are not interconnected to each other to form a continuous bore through the body as is preferred and illustrated in the drawings. Bore hole 28 is preferably sized and configured to fittingly receive a portion of a pin 18c which is used to secure a first inner chain plate 18b to a first outer chain plate 18a as well as a second inner chain plate and a second outer chain plate to form a chain link 18 as is known in the art. Such a chain 18 and associated plates and pins are included in FIGS. 4A and 4B. Additionally, as is known in the art, such a chain link typically includes a roller bushing to separate the two sets of chain plates and further serves to facilitate motion and to reduce wear between a gear that drives or guides the chain within an injector apparatus.

Figure 1A:
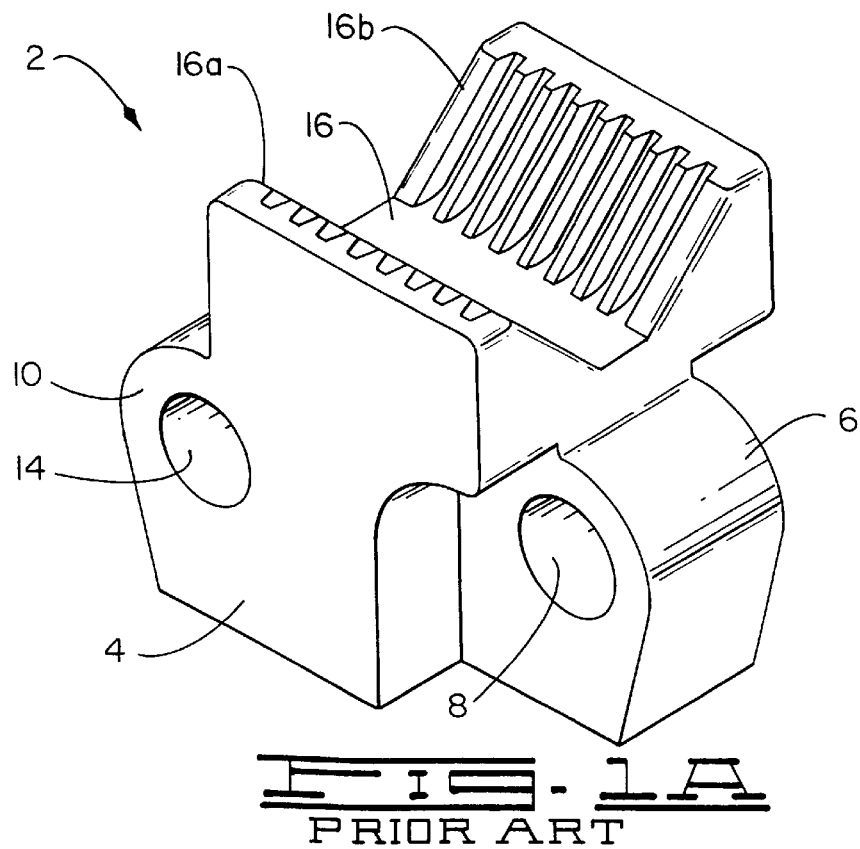
FIG. 1A is a perspective view of a prior art gripper block having the tongue portion thereof in view.
Figure 1B:
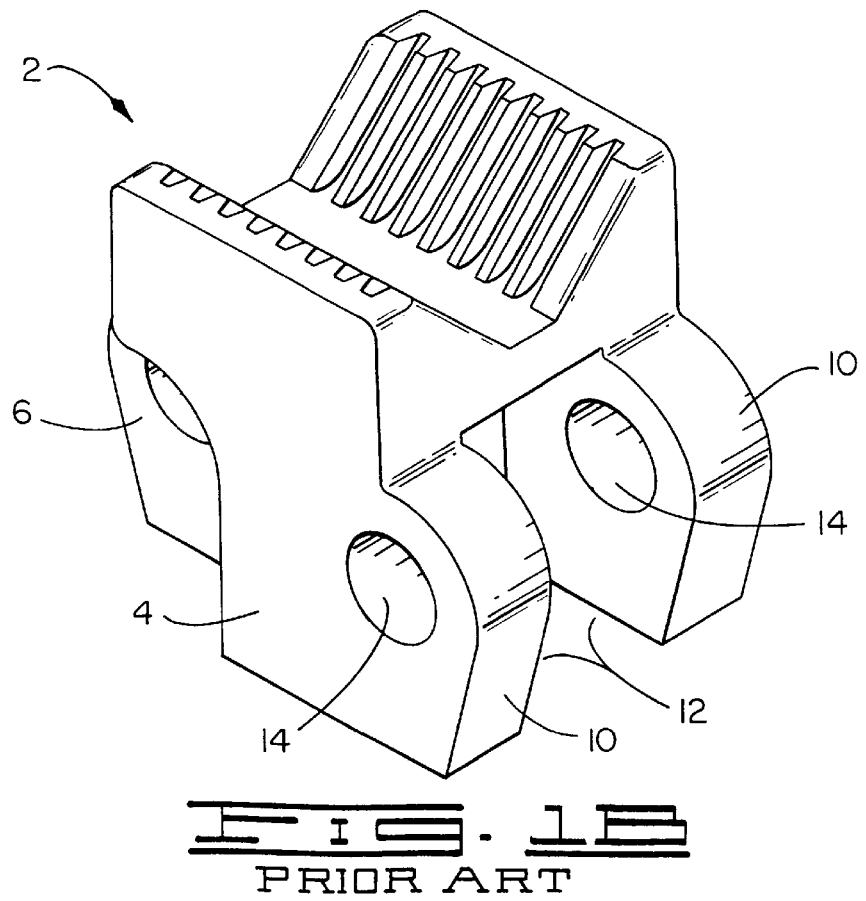
FIG. 1B is a perspective view of the gripper block shown in FIG. 1A, taken in the opposite direction and having the ear portions thereof in view.
Figure 2A:
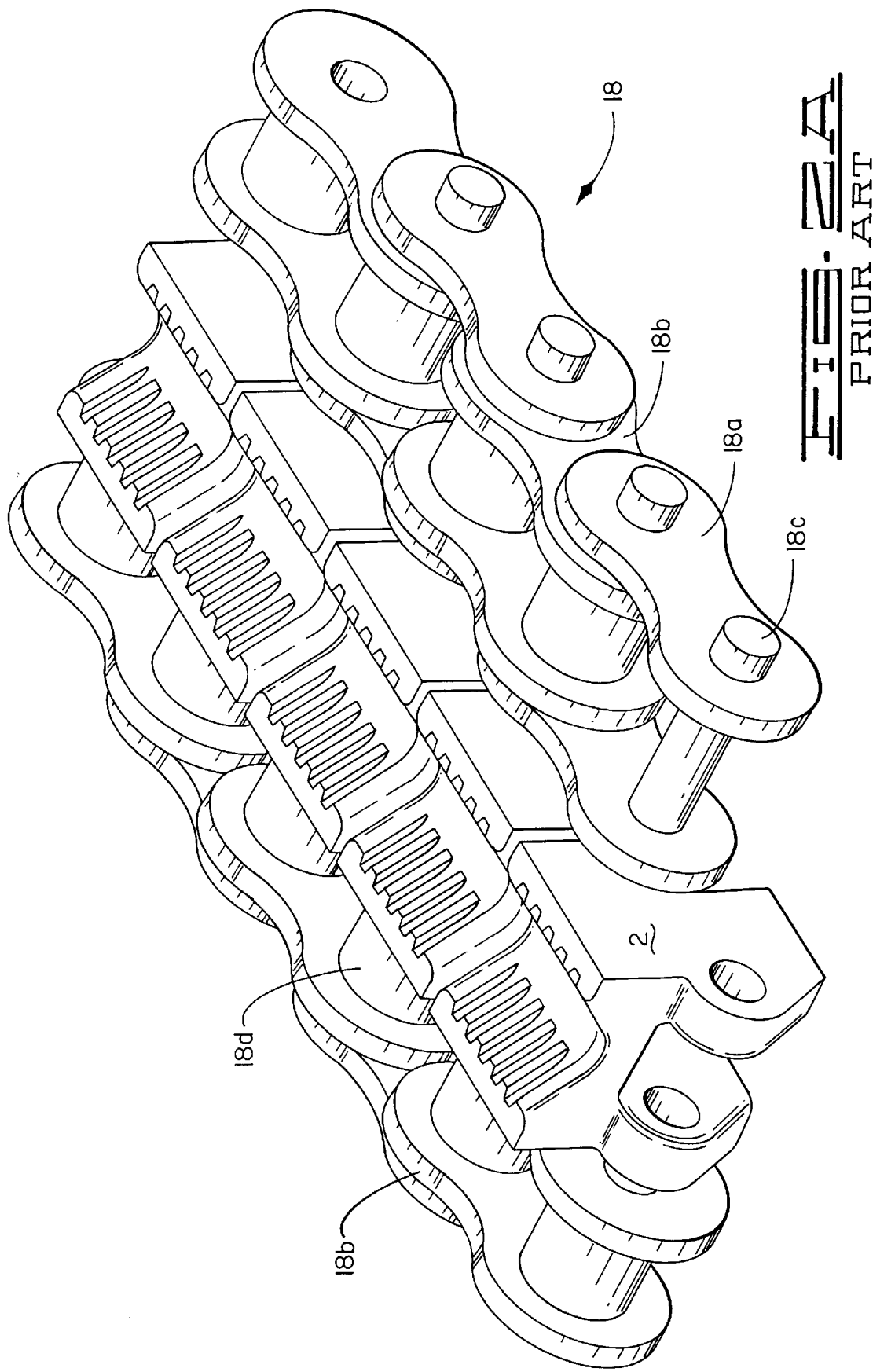
FIG. 2A is a perspective view showing a multitude of gripper blocks as installed between a segment of a pair of gripper chains.
Figure 3A:
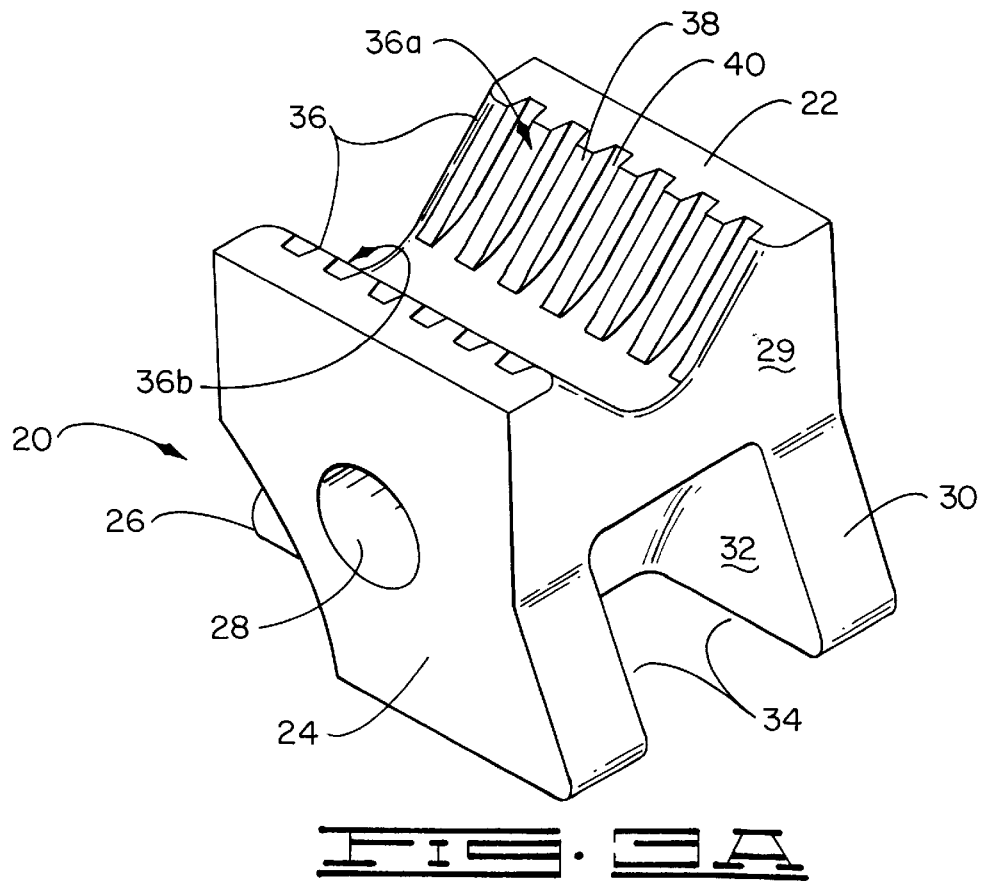
FIG. 3A is a perspective view of the preferred embodiment of the present gripper block having the ear portions in view.
Figure 3B:
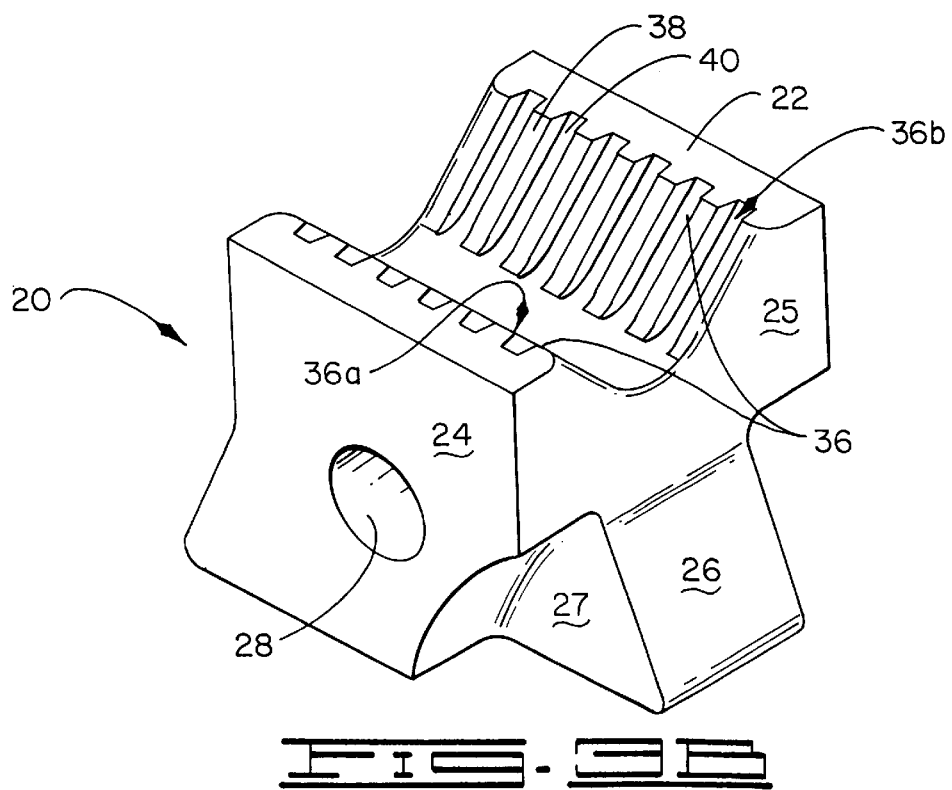
FIG. 3B is a perspective view of the preferred embodiment of the present gripper block, taken in the opposite direction of FIG. 3A and having the tongue portion in view.
Figure 3C:
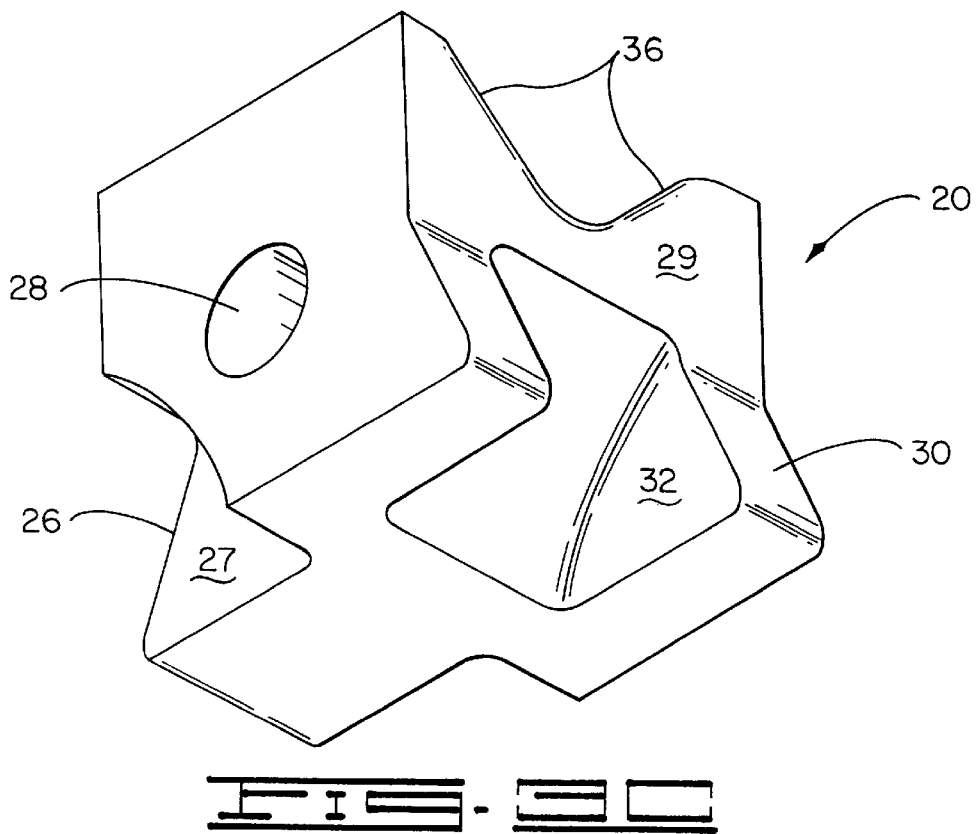
FIG. 3C is a perspective view of the preferred embodiment of the present gripper block, taken from below and having the tongue and ear portions in view.
Figure 3D:
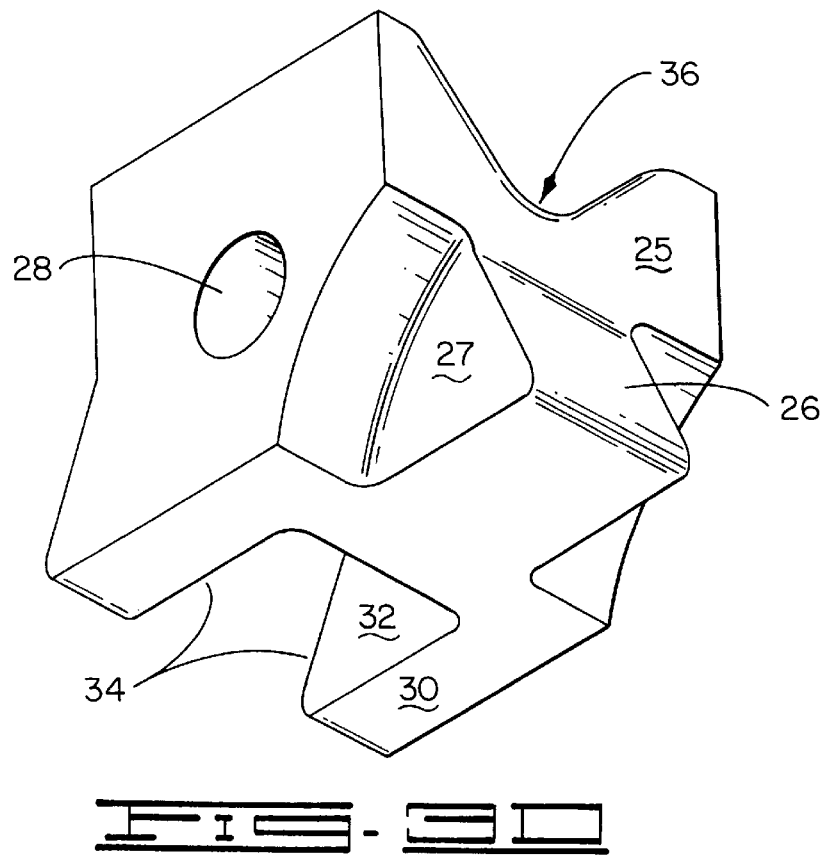
FIG. 3D is a perspective view of the preferred embodiment of the present gripper block, shown in the opposite direction of FIG. 3C.
Figure 4B:
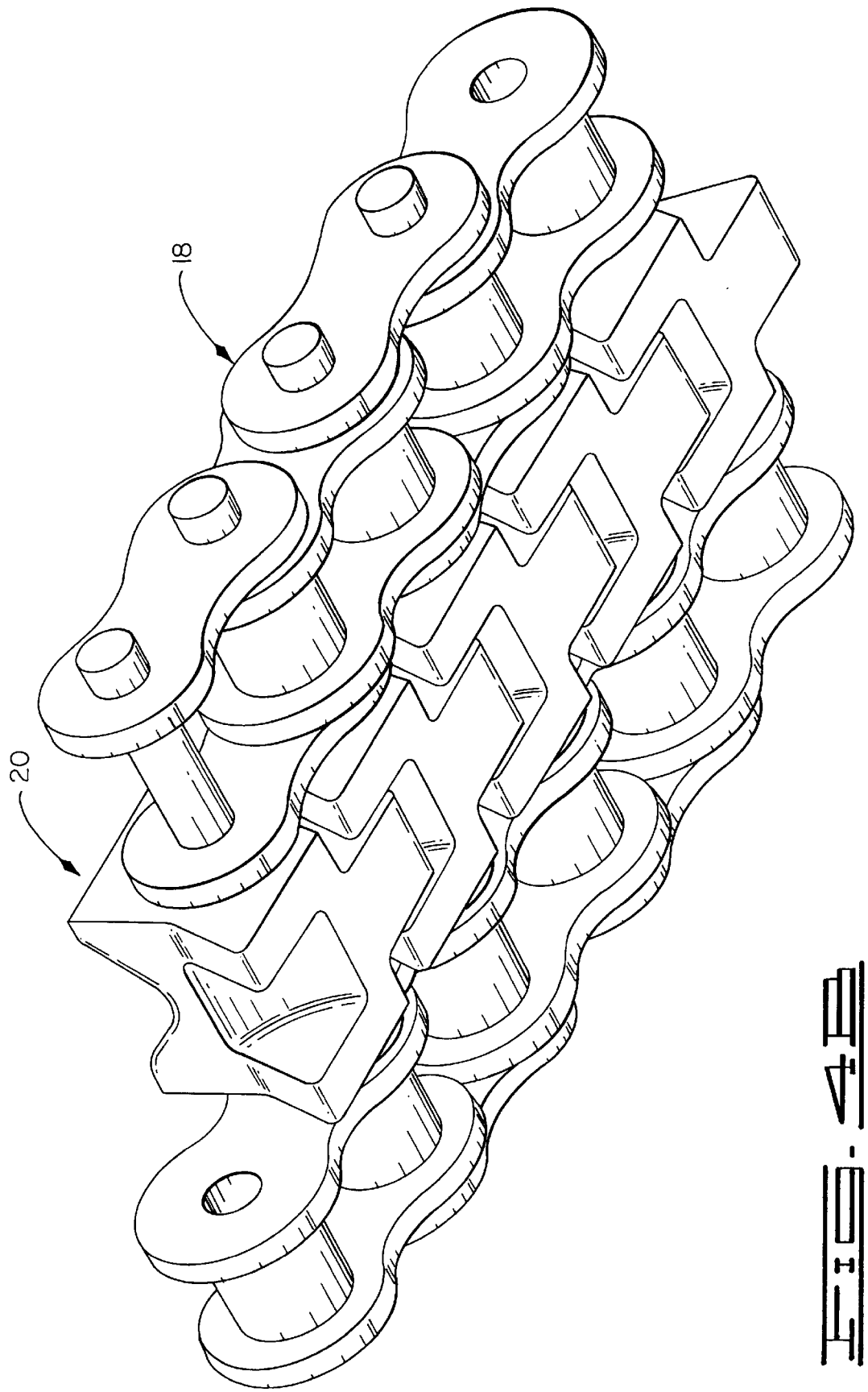
FIG. 4B is a perspective view of a multitude of the preferred gripper blocks and gripper chains of FIG. 4A, taken from below.

Returning to FIG. 3A and FIG. 3B, tongue 26 is appropriately configured and dimensioned to be accommodated without interference by a slotted or recessed region 34 which is defined by inner sides 32 of a pair of ears 30 which extend outwardly from end 29 of block 20. Ears 30 are generally wedge-shaped and are appropriately configured, dimensioned, and spaced from each other to accept tongue 26 of an identical companion gripper block positioned proximate to a first companion block upon a multitude of such blocks ultimately being installed in an injection unit on a common chain in an end to opposite end fashion as shown in FIGS. 4A and 4B of the drawings.

Returning again to FIGS. 3A and 3B, a gripping region 36 located on the upper portion of block 20 as oriented in FIGS. 3A and 3B is preferably provided with a pair of angled surfaces 36a and 36b which are angled with respect to each other so as to diverge away from the base area to form a generally V-shaped profile when viewed from either end of block 20. The surfaces in turn preferably comprise alternating ridges 38 and grooves 40 configured to resemble ACME type threads. Because such alternating ridges and grooves generally provide enhanced gripping for larger diameter tubular objects, it may be unnecessary to carry the alternating ridge and groove profile entirely to the bottom most region of 36. Thus, the bottom most surface may be essentially flat or ridgeless, or concave as shown in the drawings. Such ridgeless, or concave, region may range from about 7 to 30 percent of the width of the nominal width of the gripper body. However, the ratio may be modified to suit individual needs.

In like manner the particular depth and width of ridge portions 38 and groove portions 40 may vary to suit particular needs. However, ridge heights ranging from 0.451" to 1.25", with nominal ridge widths ranging from 0.90" to 2.501" and groove depths ranging from 0.0751" to 0.100", with groove pitch ranging from 0.251" to 0.312" have proven to be readily adaptable to workpieces having a variety of nominal outside diameters while providing for the escape of grease, paraffin, and mud, etc. which may be clinging to the exterior of tubular goods that are to be gripped by the gripper blocks. Region 36 may be rounded or chamfered near ends 29 and 25 so as to prevent unnecessary scaring of tubular objects as each gripper block engages and disengages therefrom when making its endless path within the injector. Further discussion on the gripping region is available for reference in the previously mentioned U.S. Pat. No. 5,094,340.

It will be understood by those skilled in the art that modifications to the improved gripper blocks as claimed may be made without departing from the spirit and scope of the disclosed invention.

What is claimed is:

1. A gripper block for use in connection with a device having at least one gripper chain for moving a rod, pipe, coiled tubing, cable, or like elongated object, the gripper block comprising:

a) a block body having a longitudinal axis and a single generally centrally located lateral axis having a bore coincident thereto, a first end having a tongue, a second end having a recessed region for accommodating a tongue of an adjacent gripper block;

b) a laterally oriented means of attaching the block body onto a chain coincident to the single generally centrally located lateral axis of the block body;

c) a gripping region means for engaging the tubing and transmitting injection and extraction forces upon the elongated object;

d) the gripping region having a pair of opposing surfaces being carried on the block body, the surfaces extending perpendicularly from the longitudinal axis of the block body and generally diverging with respect to the longitudinal axis of the block body; and e) the opposing surfaces of the gripping region having ridges defined by alternating crests and roots.

2. The gripper block of claim 1 wherein the block body has a pair of opposing ears extending from the second end thereof to partially define the recessed region thereof.

3. The gripper block of claim 1 wherein the opposing surfaces of the gripping region are slanted at an angle less than 120 degrees from each other.

4. The gripper block of claim 3 wherein the ridges of the opposing surfaces have crests and roots that are generally flat and the ridges generally run perpendicular to the longitudinal axis of the block body.

5. The gripper block of claim 3 wherein the opposing surfaces are slanted at an angle of approximately 90 degrees from each other.

6. The gripper block of claim 1 wherein the means of attaching the block body onto the at least one chain comprises: at least one bore sized and configured to accommodate a portion of a pin extending from the gripper chain.

7. The gripper block of claim 6 wherein the at least one bore accommodates a portion of a pin extending from a first gripper chain in a first section of the bore and accommodates a portion of a pin extending from a second gripper chain in a second section of the bore.

8. The gripper block of claim 1 wherein the opposing surfaces forming the gripping region are shaped to resemble a V when viewed from one of the ends of the gripper block.

9. The gripper block of claim 1 wherein the means of attaching the block body onto the at least one chain comprises: a plurality of bores coincident to the single generally centrally located lateral axis configured to accommodate a portion of a pin extending from respective separate gripper chains.

* * * * *